United States Patent
Jayaraman et al.

(10) Patent No.: US 12,546,440 B1
(45) Date of Patent: Feb. 10, 2026

(54) DISPENSING SYSTEM TO APPLY GREASE TO A LENS HOLDER AND METHOD THEREOF

(71) Applicant: E-CON SYSTEMS INDIA PRIVATE LIMITED, Chennai (IN)

(72) Inventors: Bharanidharan Jayaraman, Chennai (IN); Maheshwari Dhayanandan, Chennai (IN)

(73) Assignee: E-CON SYSTEMS INDIA PRIVATE LIMITED (IN)

( * ) Notice: Subject to any disclaimer, the term of this patent is extended or adjusted under 35 U.S.C. 154(b) by 0 days.

(21) Appl. No.: 18/952,009

(22) Filed: Nov. 19, 2024

(51) Int. Cl.
*F16N 29/02* (2006.01)
*F16N 11/10* (2006.01)
*F16N 29/04* (2006.01)

(52) U.S. Cl.
CPC .............. *F16N 11/10* (2013.01); *F16N 29/04* (2013.01); *F16N 2260/02* (2013.01); *F16N 2260/20* (2013.01); *F16N 2270/60* (2013.01)

(58) Field of Classification Search
CPC ................................ F16N 11/10; F16N 29/02
See application file for complete search history.

(56) References Cited

U.S. PATENT DOCUMENTS

| | | | | |
|---|---|---|---|---|
| 4,312,424 A | * | 1/1982 | Taylor | F16N 27/00 180/8.5 |
| 4,527,661 A | * | 7/1985 | Johnstone | F16C 33/6674 384/468 |
| 5,067,591 A | * | 11/1991 | Fehlig | F16N 5/02 184/29 |
| 6,053,285 A | * | 4/2000 | Reeves | F16N 29/00 91/1 |
| 7,059,450 B2 | * | 6/2006 | O'Toole | F16N 7/385 184/105.1 |
| 9,133,983 B2 | * | 9/2015 | Kettunen | A01G 23/091 |
| 10,576,596 B2 | * | 3/2020 | Bangma | F16N 13/22 |
| 10,663,112 B2 | * | 5/2020 | Shafer | F16N 13/16 |
| 11,988,329 B1 | * | 5/2024 | Horvath | E21B 43/2607 |

(Continued)

FOREIGN PATENT DOCUMENTS

| | | |
|---|---|---|
| CN | 215981937 U | 3/2022 |
| CN | 218132861 U | 12/2022 |

(Continued)

*Primary Examiner* — Michael A Riegelman
(74) *Attorney, Agent, or Firm* — Jason C. Cameron

(57) ABSTRACT

A dispensing system to apply grease to a lens holder is provided. The dispensing system includes a lens holder cavity adapted to accommodate a lens holder and a loading area. The loading area includes a damping grease cartridge to accommodate the grease. The dispensing system includes a nozzle apply a predetermined volume of the grease to the inner diameter of the threads. The dispensing system includes a first servo motor to control the height of the lens holder and a second servo motor to ensure a uniform dispense of the predetermined volume grease. The dispensing system is controlled by a programmable logic controller that includes a human machine interface panel adapted to control process parameters. The programmable logic controller and the human machine interface panel are adapted to modify dispensing time, rotation speed, rotation angle to regulate dispensing of the grease.

14 Claims, 3 Drawing Sheets

(56) References Cited

U.S. PATENT DOCUMENTS

| | | | | |
|---|---|---|---|---|
| 2004/0003969 | A1* | 1/2004 | O'Toole | F16N 19/00 |
| | | | | 184/26 |
| 2012/0031705 | A1* | 2/2012 | Divisi | F16N 27/005 |
| | | | | 184/55.1 |
| 2012/0247876 | A1* | 10/2012 | Kreutzkamper | F16N 7/385 |
| | | | | 184/14 |
| 2015/0330564 | A1* | 11/2015 | Mueller | F16N 11/08 |
| | | | | 184/7.4 |
| 2016/0169446 | A1* | 6/2016 | Peters | H04B 5/77 |
| | | | | 222/23 |
| 2017/0113315 | A1* | 4/2017 | Bangma | B23Q 11/1046 |
| 2023/0126731 | A1* | 4/2023 | Peacock | F16N 29/02 |
| | | | | 184/6.1 |
| 2025/0254423 | A1* | 8/2025 | Yogesh | H04N 23/54 |

FOREIGN PATENT DOCUMENTS

| | | | | |
|---|---|---|---|---|
| CN | 118328280 A | * | 7/2024 | F16N 23/00 |
| JP | 2022139673 A | * | 9/2022 | |
| KR | 100738323 B1 | | 7/2007 | |

* cited by examiner

DISPENSING SYSTEM TO APPLY GREASE TO A LENS HOLDER AND METHOD THEREOF

FIELD OF INVENTION

Embodiments of a present disclosure relate to a technical field of dispensing machines and more particularly to a dispensing system to apply grease to a lens holder and method thereof.

BACKGROUND

Traditionally, the application of damping grease relied on manual processes carried out by operators. In this approach, there were notable challenges such as inadequate volume and high-volume issues observed during dispensing. These challenges resulted in failures and yield drops within the production line. A critical challenge that was faced was the inconsistent volume of grease that was applied. Insufficient grease led to suboptimal performance of several components. Conversely, excessive grease led to leakage, contamination and unnecessary material wastage. This inconsistent dispense of grease was also a result of various operators applying the grease. Further, the manual process faced limitations such as time-consuming, labour costs and quality control.

Hence, there is a need for an automated dispensing system to apply grease to a lens holder which addresses the aforementioned issues.

OBJECTIVES OF THE INVENTION

An objective of the invention is to provide a dispensing system that is capable of dispensing a predetermined amount of grease to a lens holder.

Another objective of the invention is to enhance the repeatability of the process, contributing to more consistent and reliable outcomes.

BRIEF DESCRIPTION

In accordance with another embodiment, a dispensing system to apply grease to a lens holder is provided. The dispensing system includes a lens holder cavity adapted to adjust based on a plurality of variables to accommodate a variety of lens holder, wherein the plurality of variables are height and diameter of the lens holder. The dispensing system includes a loading area comprising a damping grease cartridge wherein the damping grease cartridge is adapted to accommodate the grease loaded by an operator. The dispensing system includes a nozzle adapted to apply a predetermined volume of the grease to the inner diameter of the plurality of threads wherein the plurality of threads are positioned towards the inner diameter of the lens holder. The nozzle includes an aperture positioned at a curved surface to dispense the grease. Further, the dispensing system includes a pneumatic piston connected to the damping grease cartridge adapted to exert pressure to facilitate the transfer of the grease to the nozzle. Furthermore, the dispensing system includes a plurality of servo motors. The plurality of servo motors includes a first servo motor connected to the nozzle wherein the first servo motor is adapted to control an upward and downward movement of the nozzle thereby controlling the height of the lens holder and a second servo motor connected to the lens holder wherein the second servo motor is adapted to rotate the lens holder in a full angle automatically wherein rotation of the lens holder and the upward and downward movement of the nozzle causes a uniform dispense of the predetermined volume grease along the inner diameter of the lens holder via the aperture. Moreover, the dispensing system includes a programmable logic controller adapted to control the dispensing system. The programmable login controller includes a human machine interface panel adapted to control a plurality of process parameters wherein the plurality of parameters comprises a variation in speed for uniform dispensing at the right position. The programmable logic controller and the human machine interface panel modify a plurality of process parameters to regulate the dispensing of the grease, wherein the plurality of process parameters comprises dispensing time, rotation speed and rotation angle.

In accordance with one embodiment of the disclosure a method for operating a dispensing system to apply grease to a lens holder. The method includes adjusting, a lens holder cavity, based on a plurality of variables, wherein the plurality of variables are height and diameter of the lens holder to accommodate a variety of lens. The method includes accommodating, by a damping grease cartridge connected to a loading area, the grease loaded by an operator. The method includes applying, by the nozzle, a predetermined volume of the grease to the inner diameter of the plurality of threads wherein the nozzle includes an aperture positioned at a curved surface. The method includes exerting, by a pneumatic piston connected to the damping grease cartridge, pressure to facilitate the transfer of the grease to the nozzle. The method includes controlling, by a first servo motor connected to the nozzle, an upward and downward movement of the nozzle thereby controlling the height of the lens holder. The method includes rotating, by a second servo motor connected to the lens holder, the lens holder in a full angle automatically wherein rotation of the lens holder and the upward and downward movement of the nozzle causes a uniform dispense of the predetermined volume grease along the inner diameter of the lens holder via the aperture. The method includes controlling, by a human machine interface panel of a programmable logic controller, a plurality of process parameters wherein the plurality of parameters comprises a variation in speed uniform dispensing at the right position. Further, the programmable logic controller and the human machine interface panel modify a plurality of process parameters, wherein the plurality of process parameters comprises dispensing time, rotation speed and rotation angle.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
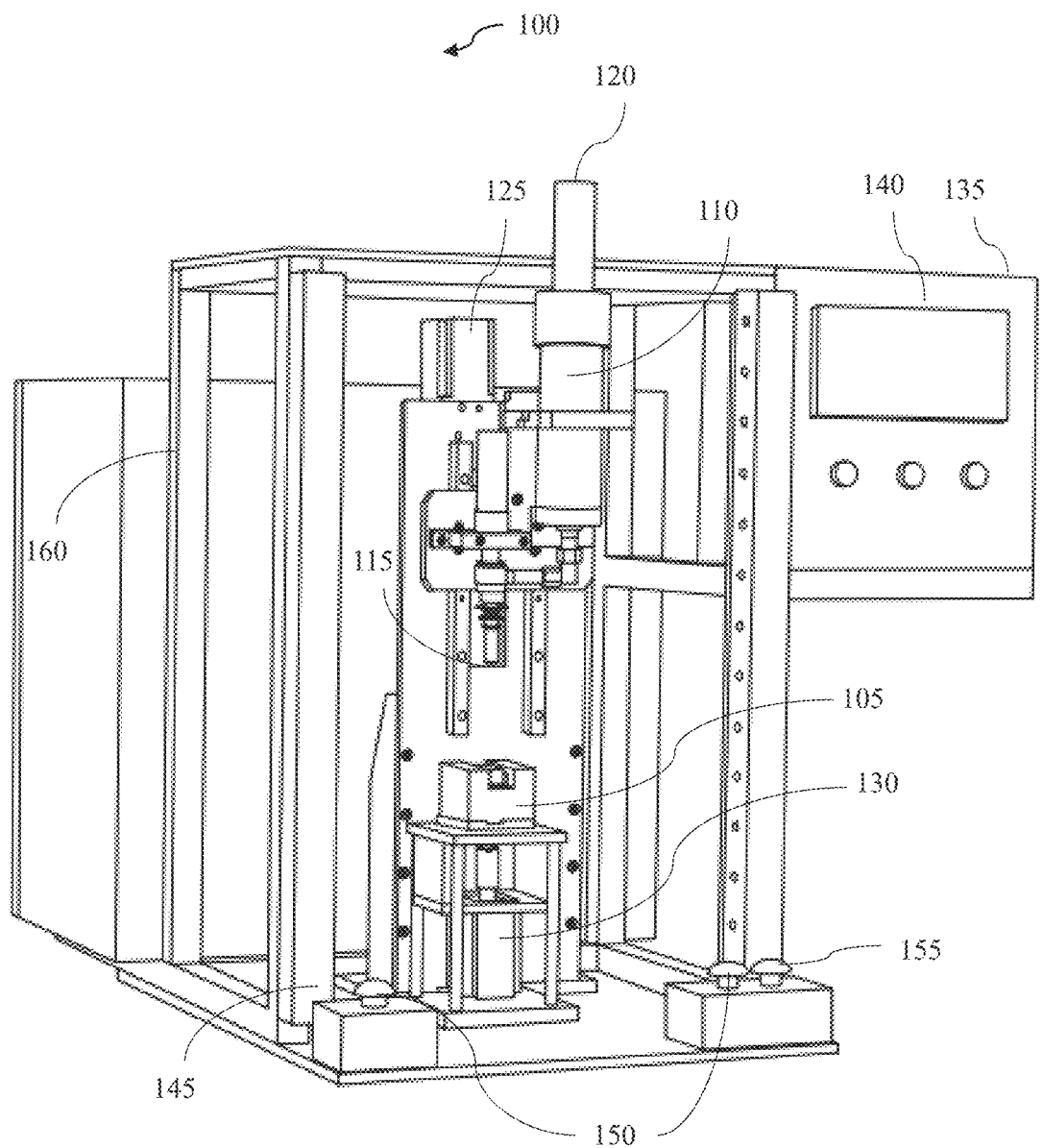
FIG. 1 is a schematic representation of a dispensing system to apply grease to a lens holder in accordance with an embodiment of the present disclosure.

Further, those skilled in the art will appreciate that elements in the figures are illustrated for simplicity and may not have necessarily been drawn to scale. Furthermore, in terms of the construction of the system, one or more components of the system may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a dispensing system to apply grease to a lens holder is disclosed. The dispensing system includes a lens holder cavity adapted to adjust based on a plurality of variables to accommodate a variety of lens holder, wherein the plurality of variables are height and diameter of the lens holder. The dispensing system includes a loading area comprising a damping grease cartridge wherein the damping grease cartridge is adapted to accommodate the grease loaded by an operator. The dispensing system includes a nozzle adapted to apply a predetermined volume of the grease to the inner diameter of the plurality of threads wherein the plurality of threads are positioned towards the inner diameter of the lens holder. The nozzle includes an aperture positioned at a curved surface to dispense the grease. Further, the dispensing system includes a pneumatic piston connected to the damping grease cartridge adapted to exert pressure to facilitate the transfer of the grease to the nozzle. Furthermore, the dispensing system includes a plurality of servo motors. The plurality of servo motors includes a first servo motor connected to the nozzle wherein the first servo motor is adapted to control an upward and downward movement of the nozzle thereby controlling the vertical movement of the nozzle towards the portion in the inner side of the lens holder and a second servo motor connected to the lens holder wherein the second servo motor is adapted to rotate the lens holder in a full angle automatically wherein rotation of the lens holder and the upward and downward movement of the nozzle causes a uniform dispense of the predetermined volume grease along the inner diameter of the lens holder via the aperture. Moreover, the dispensing system includes a programmable logic controller adapted to control the dispensing system. The programmable login controller includes a human machine interface panel adapted to control a plurality of process parameters wherein the plurality of parameters comprises a variation in speed for uniform dispensing at the right position. The programmable logic controller and the human machine interface panel modify a plurality of process parameters to regulate the dispensing of the grease, wherein the plurality of process parameters comprises dispensing time, rotation speed and rotation angle.

FIG. 1 is a schematic representation of a dispensing system 100 to apply grease to a lens holder in accordance with an embodiment of the present disclosure. The dispensing system 100 includes a lens holder cavity 105 adapted to adjust based on a plurality of variables to accommodate a variety of lens holder (not shown in FIG. 1). The plurality of variables are height and diameter of the lens holder cavity 105. Typically, the lens holder cavity 105 is designed to dynamically adjust its shape and size based on various parameters, enabling it to securely accommodate different types and sizes of lens holder. This adaptability ensures that the lens holder can effectively hold lenses with varying dimensions, shapes, and materials, providing a stable and secure fit for each specific lens.

In one embodiment, the system 100 utilizes advanced sensors (not shown in FIG. 1) and actuators (not shown in FIG. 1) to measure and respond to these variables in real-time. For instance, the sensors detect the lens' diameter and curvature, while the actuators adjust the cavity's size and shape accordingly.

The dispensing system 100 includes a loading area comprising a damping grease cartridge 110 wherein the damping grease cartridge 110 is adapted to accommodate the grease loaded by an operator. The grease can be easily loaded and replenished by the operator, ensuring that the dispensing system 100 maintains optimal performance.

The dispensing system 100 includes a nozzle 115 adapted to apply a predetermined volume of the grease to the inner diameter of the plurality of threads wherein the plurality of threads are positioned towards the inner diameter of the lens holder. Typically, the plurality of threads are critical components that likely serve to secure or align the lens within the holder. To ensure the plurality of threads function smoothly and remain free from dust and damage, the nozzle 115 is configured to apply a predetermined volume of grease directly to the inner diameter where the threads are situated.

Further, the nozzle 115 includes an aperture 118 positioned in a curved surface to dispense the grease. In one embodiment, the aperture 118 (shown in FIG. 2*a*, FIG. 2*b*) is 4 mm in diameter.

In one embodiment, the application of the grease acts as a barrier to prevent dust particles from settling on the threads, which can cause friction and impair the movement or stability of the lens holder.

In one embodiment, the size of the nozzle 115 is based on the height of the lens holder and wherein the said size is swappable based on the variety of the lens holder. Examples of the size of the nozzle 115 includes, but is not limited to, 2 mm, 3 mm, 4 mm, 5 mm, 6 mm, 7 mm, 8 mm. In a specific embodiment, the nozzle 115 has three different sizes, 2 mm, 4 mm and 6 mm.

In another embodiment, the nozzle 115 is fabricated from polyoxymethylene. It must be noted that the nozzle 115 may be fabricated from any other similar material and is not limited to the said polyoxymethylene.

The dispensing system 100 includes a pneumatic piston 120 connected to the damping grease cartridge 110 adapted to exert pressure to facilitate the transfer of the grease from a cartridge to the nozzle 115. The applied pressure ensures that a controlled and precise amount of grease is transferred from the cartridge to the nozzle 115. The nozzle 115 then applies this grease to the inner surface of the plurality of threads, as discussed previously. Typically, the pneumatic piston 120 uses compressed air to generate mechanical force. When air pressure is applied to the piston, it moves in a controlled manner. Further, the damping grease cartridge 110 contains the grease used for lubricating the threads within the lens holder cavity 105.

The dispensing system 100 includes a plurality of servo motors. Typically, a servo motor a rotary actuator or linear actuator that allows for precise control of angular or linear position, velocity, and acceleration. It consists of a motor coupled to a sensor for position feedback. This type of motor is widely used in applications requiring precise control of position and motion.

Specifically, the plurality of servo motors includes a first servo motor 125 and a second servo motor 130. The first servo motor 125 is connected to the nozzle 115 wherein the first servo motor 125 is adapted to control an upward and downward movement of the nozzle 115 thereby controlling the height of the lens holder. The first servo motor 125 is controlled by the human machine interface panel 135. The second servo motor 130 is connected to the lens holder wherein the second servo motor 130 is adapted to rotate the lens holder in a full angle automatically. It must be noted that the rotation of the lens holder together with the upward and downward movement of the nozzle causes a uniform dispense of the predetermined volume grease along the inner diameter of the lens holder via the aperture 118.

The dispensing system 100 includes a programmable logic controller adapted to control the dispensing system 100. Typically, the programmable logic controller is adapted to manage the dispensing process, allowing for customizable dispensing patterns and quantities. The programmable logic controller includes a human machine interface panel 135 adapted to control a plurality of process parameters wherein the plurality of parameters comprises a variation in speed for uniform dispensing at the right position. Typically, the human machine interface panel 135 is adapted to provide an interface for operators to set parameters, monitor the process, and make adjustments.

In one embodiment, the human machine interface panel 135 includes a display unit 140 to display a plurality of the process parameters. Additionally, the programmable logic controller and the human machine interface panel 135 modify a plurality of process parameters to regulate the dispensing of the grease, wherein the plurality of process parameters comprises dispensing time, rotation speed and rotation angle.

Further, the dispensing system 100 includes a safety sensor 145 adapted to alert the operator at the occurrence of an interruption and automatically pause the dispensing process. The safety sensor 145 is configured to detect interruptions or abnormalities during the dispensing process. When such an interruption occurs, the sensor immediately alerts the operator. This alert can be in the form of an audible alarm, a visual indicator (such as a flashing light), or a notification on a display unit 140. In addition to alerting the operator, the safety sensor 145 is also programmed to automatically pause the dispensing process upon detecting an interruption. This automatic pause helps prevent potential damage to the system, the lens holder, or any other components involved in the dispensing process. It also provides the operator with the opportunity to investigate and resolve the issue before resuming the operation.

Furthermore, the dispensing system 100 includes one or more push buttons 150, an emergency button 155 and a filtration regulator unit 160. The one or more push buttons 150 are adapted to initiate the dispensing process. These buttons might be used for starting or stopping the dispensing process, adjusting settings, or performing specific tasks like calibrating the system or resetting an alert. The emergency button 155 is adapted to stop the dispensing process manually by the operator. Further, the emergency button 155 is a critical safety feature that provides an immediate way to halt the system in case of an emergency. When pressed, the emergency button 155 instantly stops all operations, ensuring the safety of the operator and preventing potential damage to the system or the lens holder being dispensed. The emergency button 155 is typically large and easily accessible to ensure quick response in urgent situations. The filtration regulator unit 160 is connected to the pneumatic piston 120 wherein the filtration regulation unit 160 is adapted to control the air pressure entering into the pneumatic piston 120. In one embodiment, the filtration regulator unit 160 is responsible for maintaining clean and controlled air flow within the dispensing system 100. The filtration regulation unit 160 ensures that any air used in the system, such as for pneumatic piston 120 or other components, is free of contaminants like dust and moisture.

Consider a non-limiting example where an operator "X" uses the dispensing system 100 to apply grease to a lens holder. The operator "X" loads a desired amount of grease in the damping grease cartridge 110 pertaining to a loading area and activates the dispensing system 100 by pressing the push button 150. A pneumatic piston 120 is employed to exert pressure on the grease within the damping grease cartridge 110, facilitating its transfer to the nozzle 115. Simultaneously, a first servo motor 125 controls the upward and downward movement of the nozzle 115, while a second servo motor 130 rotates the lens holder loading jig. This rotation ensures the even dispensing of grease along the inner diameter of the lens holder. The entire dispensing system 100, including the first servo motor 125 and the second servo motor 130, is seamlessly coordinated, and controlled by the Programmable Logic Controller. Specifically, a human machine interface panel is present for controlling the dispensation of the grease, where the dispensation can vary in speed for upward and downward movements. These variable speed adjustments are controllable through the HMI panel. This allows customization of the product, with the option to use various lens holders and enclosures in the dispensing system 100. The lens holder cavity 105 can be adjusted based on variables such as height and diameter. During the dispensation process, the user "X" can press the emergency button 155 to halt the dispensing system 100.

Figures 2A, 2B:
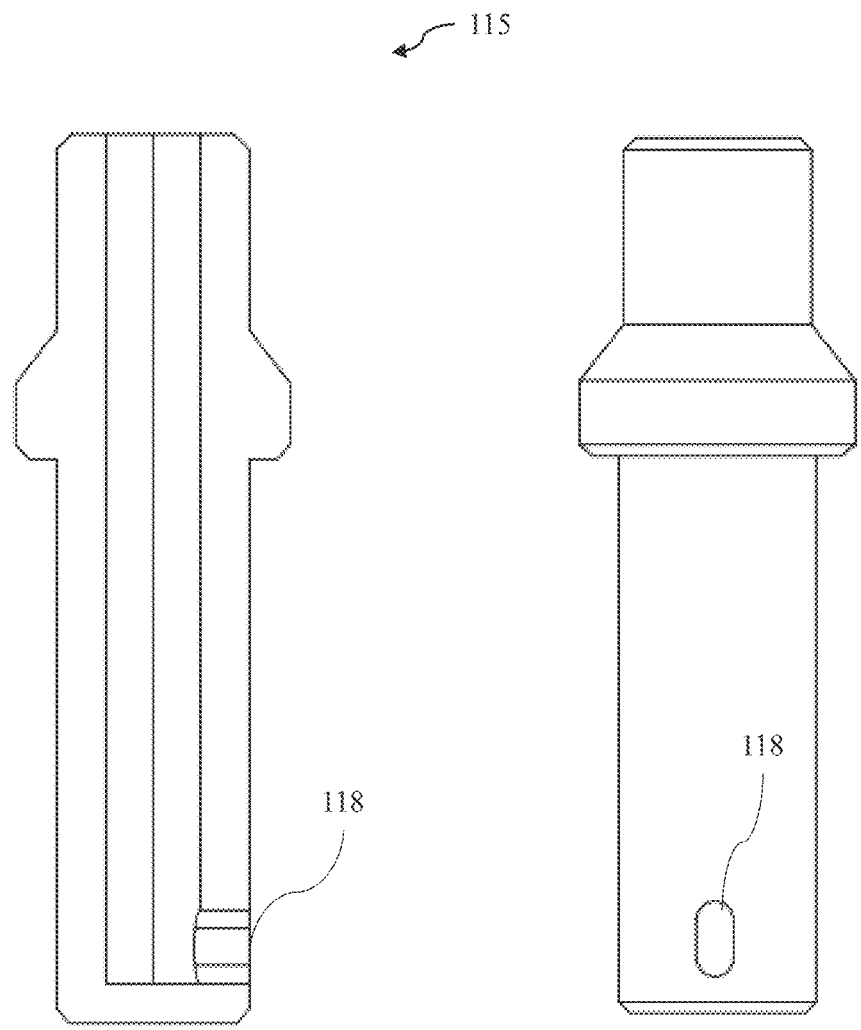
FIG. 2a is a schematic diagram of the nozzle of FIG. 1 in accordance with an embodiment of the present disclosure.
FIG. 2b is a cross-sectional view of the nozzle of FIG. 1 in accordance with an embodiment of the present disclosure.

FIG. 2a is a schematic diagram of the nozzle of FIG. 1 in accordance with an embodiment of the present disclosure. Typically, the nozzle 115 is a cylindrical with a hollow space inside. The grease is injected from a top surface of the nozzle 115 and fills up the said hollow space. When pressure is applied, the grease is dispensed through an aperture 118. The aperture 118 is positioned at a curved surface of the nozzle 115.

FIG. 2b is a cross-sectional view of the nozzle of FIG. 1 in accordance with an embodiment of the present disclosure. In one embodiment, the size of the aperture is 4 mm in diameter.

Figure 3:
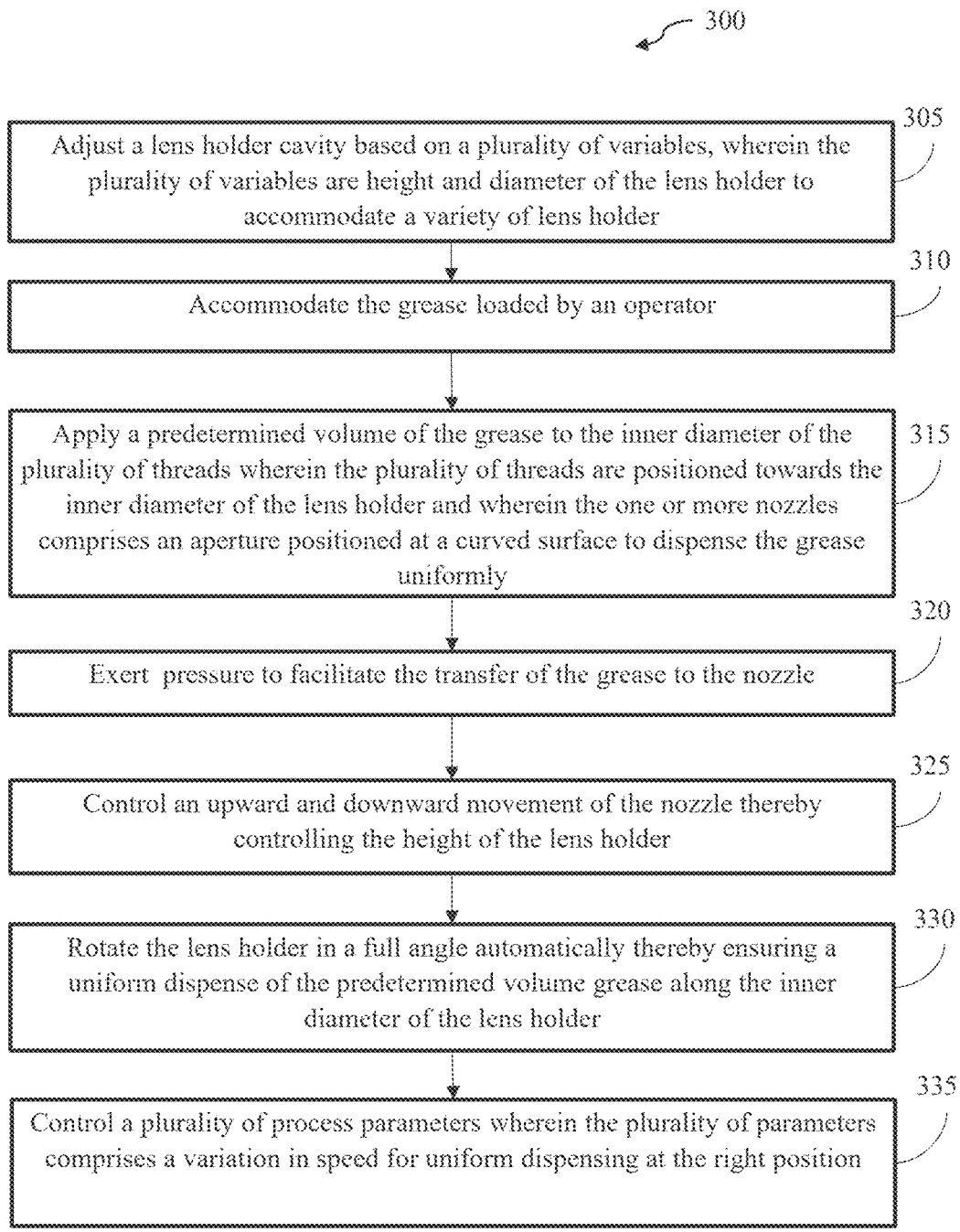
FIG. 3 is a flow chart representing steps involved in a method for operating a dispensing system to apply grease to a lens holder in accordance with an embodiment of the present disclosure.

FIG. 3 is a flow chart representing steps involved in a method 300 for operating a dispensing system to apply grease to a lens holder in accordance with an embodiment of the present disclosure. As a pre-requisite, an operator presses a start button of the dispensing system. The method begins at step 305.

At step 305, a lens holder cavity is adjusted based on a plurality of variables, wherein the plurality of variables are height and diameter of the lens holder to accommodate a variety of lens holder. Typically, the lens holder cavity is a precisely designed space or compartment within a lens assembly or optical device that securely accommodates and positions an optical lens. The lens holder cavity ensures that the lens is held in the correct alignment and orientation to achieve the desired optical performance. Further, the height and diameter of a lens holder designed to accommodate a lens depend on several factors, including the size and shape of the lens, the intended application, and the specific design requirements of the optical system.

At step 310, a damping grease cartridge connected to a loading area accommodates the grease loaded by the operator. The damping grease cartridge connected to a loading area is a crucial component in the automated dispensing system, ensuring a consistent supply of grease for the dispensing process. Typically, the damping grease is a container to hold the grease and is easily refilled or replaced. The operator opens an access port in the loading area to load the grease either by refilling an existing cartridge or by replacing an empty cartridge with a pre-filled one. The damping grease cartridge is then securely attached to the dispensing system.

At step 315, a predetermined volume of the grease is applied to the inner diameter of the plurality of threads by the nozzle. The grease is drawn from the damping grease cartridge.

At step 320, pressure is exerted, by a pneumatic piston to the damping grease cartridge to facilitate the transfer of the grease to the nozzle. The pneumatic piston provides compressed air to drive the piston in a vertical direction thereby exerting pressure on the damping grease cartridge.

At step 325, an upward and downward movement of the nozzle is controlled by a first servo motor connected to the nozzle thereby controlling the height of the lens holder. The height of the lens holder is controlled by the upward and downward movement of the nozzle, which is powered by a first servo motor. Typically, the first servo motor's rotational motion is converted into a linear movement thereby causing the nozzle to move up and down. After the grease is dispensed via an aperture (positioned in a curved surface), the nozzle moves back to its original position.

At step 330, the lens holder in a full angle is rotated automatically by a second servo motor connected to the lens holder thereby ensuring a uniform dispense of the predetermined volume grease along the inner diameter of the lens holder. The second servo motor is adapted to automatically rotate the lens holder. It must be noted that the rotation of the lens holder with the rotation of the upward and downward movement of the nozzle causes a uniform dispense of the predetermined volume of damping grease along the inner diameter of the lens holder via the aperture. This approach provides precise control over the rotational movement, resulting in consistent and even application of grease.

At step 335, a plurality of process parameters is controlled by a human machine interface panel of a programmable logic controller wherein the plurality of parameters comprises a variation in speed for uniform dispensing at the right position. e.

The programmable logic controller and the human machine interface panel modify a plurality of process parameters, wherein the plurality of process parameters comprises dispensing time, rotation speed and rotation angle.

The method ends at step 335.

Various embodiments of the present disclosure provides a dispensing system to apply grease to a lens holder and a method of operation. The present disclosure as described above offers numerous advantages. The dispensing system 100 is automated thereby ensuring precision and consistency of the dispensation of grease. There is a significant transition from the manual process to automated processes for applying damping grease. The automated processes addresses several challenges and significantly improved the production and yield quality. For instance, by transitioning from manual to automated damping grease dispensing, manufacturers can overcome the inherent challenges of manual application. Automation brings precision, efficiency, and consistency to the production process, leading to improved first-pass production yield, enhanced product quality, and reduced operational costs. This transition ultimately results in more reliable products and a more streamlined and efficient production line.

Further, by incorporating a safety sensor 145, the dispensing system 100 ensures that any interruptions are promptly addressed, minimizing the risk of errors, damage, or accidents. This feature significantly improves the overall safety and reliability of the dispensing system 100, providing operators with greater confidence in its operation. By regulating the quality of the air, the filtration regulator unit 160 helps to maintain the precision and reliability of the dispensing system 100 and extends the lifespan of its components. By lubricating the threads, the grease reduces friction during the threading process, thereby minimizing wear and tear and preventing potential damage to the threads over time. the presence of grease ensures that the threads can engage and disengage smoothly, enhancing the overall functionality and reliability of the lens holder mechanism. By integrating a first servo motor 125 to control the upward and downward movement of the nozzle, the dispensing system 100 provides a precise control over the height of the lens holder. This results in accurate and consistent application of damping grease, improving the efficiency and quality of the production process. The ability to dynamically adjust the nozzle height and subsequently change the nozzle enhances flexibility and accommodates various lens holder and application requirements. Further, by utilizing a second servo motor 130 to automatically rotate the lens holder, the dispensing system ensures the uniform dispensing of damping grease along the inner diameter of the lens holder.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A dispensing system to apply grease to a lens holder comprising:
    a lens holder cavity adapted to adjust based on a plurality of variables to accommodate a variety of lens holder, wherein the plurality of variables are height and diameter of the lens holder cavity;
    a loading area comprising a damping grease cartridge wherein the damping grease cartridge is adapted to accommodate the grease loaded by an operator;
    one or more nozzles adapted to apply a predetermined volume of the grease to the inner diameter of the plurality of threads wherein the plurality of threads are positioned towards the inner diameter of the lens holder and wherein the one or more nozzles comprises an aperture positioned at a curved surface to dispense the grease uniformly;
    a pneumatic piston connected to the damping grease cartridge adapted to exert pressure to facilitate the transfer of the grease to the nozzle;
    a plurality of servo motors comprising:
        a first servo motor connected to the nozzle wherein the first servo motor is adapted to control an upward and downward movement of the nozzle thereby controlling the height of the lens holder;
        a second servo motor connected to the lens holder wherein the second servo motor is adapted to rotate the lens holder in a full angle automatically,
    wherein the rotation of the lens holder and the upward and downward movement of the nozzle causes a uniform dispense of the predetermined volume grease along the inner diameter of the lens holder via the aperture;
    a programmable logic controller adapted to control the dispensing system wherein the programmable logic controller comprises:
        a human machine interface panel adapted to control a plurality of process parameters wherein the plurality of parameters comprises a variation in speed for uniform dispensing at the right position,
        wherein the programmable logic controller and the human machine interface panel modify a plurality of process parameters to regulate the dispensing of the grease, wherein the plurality of process parameters comprises dispensing time, rotation speed and rotation angle.

2. The dispensing system according to claim 1, wherein the human machine interface panel comprises a display unit to display a plurality of the process parameters.

3. The dispensing system according to claim 1, wherein the size of the one or more nozzles is based on the height of the lens holder wherein the said size is swappable based on the variety of the lens holder.

4. The dispensing system according to claim 1, wherein the nozzle is fabricated from polyoxymethylene.

5. The dispensing system according to claim 1, further comprising a safety sensor adapted to alert the operator at the occurrence of an interruption and automatically pause the dispensing process.

6. The dispensing system according to claim 1, wherein the first servo motor is controlled by the human machine interface panel.

7. The dispensing system according to claim 1, comprising:
    one or more push buttons adapted to initiate the dispensing process;
    an emergency button adapted to stop the dispensing process manually by the operator; and
    a filtration regulator unit connected to the pneumatic piston wherein the filtration regulation unit is adapted to control the air pressure entering into the pneumatic piston.

8. A method for operating the dispensing system according to claim 1 to apply grease to the lens holder comprising:
    adjusting, the lens holder cavity, based on the plurality of variables;
    accommodating, by the damping grease cartridge connected to the loading area, the grease loaded by the operator;
    applying, by the one or more nozzles, the predetermined volume of the grease to the inner diameter of the plurality of threads;
    exerting, by the pneumatic piston connected to the damping grease cartridge, pressure to facilitate the transfer of the grease to the nozzle;
    controlling, by the first servo motor connected to the one or more nozzles, the upward and downward movement of the nozzle thereby controlling the height of the lens holder;
    rotating, by the second servo motor connected to the lens holder, the lens holder in the full angle automatically; and
    controlling, by the human machine interface panel of the programmable logic controller, the plurality of process parameters.

9. The method according to claim 8, further comprises displaying a plurality of the process parameters via a display unit of the human machine interface panel.

10. The method according to claim 8, wherein the size of the one or more nozzles is based on the height of the lens holder wherein the said size is swappable based on the variety of the lens holder.

11. The method according to claim 8, wherein the nozzle is fabricated from polyoxymethylene.

12. The method according to claim 8, further comprises alerting the operator at the occurrence of an interruption and automatically pause the dispensing process by a safety sensor.

13. The method according to claim 8, wherein the first servo motor is controlled by the human machine interface panel.

14. The method according to claim 8, comprising:
   initiating the dispensing process by one or more push buttons;
   stopping the dispensing process manually by the operator by an emergency button; and
   controlling the air pressure entering into the pneumatic piston by a filtration regulator unit connected to the pneumatic piston.

\* \* \* \* \*